United States Patent [19]

Alberts et al.

[11] Patent Number: 4,794,142

[45] Date of Patent: Dec. 27, 1988

[54] USE OF SPECIAL ETHYLENE-VINYL ACETATE-COPOLYMERS FOR THE MODIFICATION OF PVC

[75] Inventors: Heinrich Alberts; Herbert Bartl, both of Odenthal; Otto Billinger, Linz; Fritz Mietzsch, Bergisch Gladbach, all of Fed. Rep. of Germany

[73] Assignee: Bayer Aktiengesellschaft, Leverkusen, Fed. Rep. of Germany

[21] Appl. No.: 83,230

[22] Filed: Aug. 10, 1987

[30] Foreign Application Priority Data

Aug. 12, 1986 [DE] Fed. Rep. of Germany ....... 3628315

[51] Int. Cl.[4] .................... C08L 23/08; C08L 27/06; C08L 33/02
[52] U.S. Cl. .................................. 525/196; 523/351; 525/197; 525/201; 525/209; 525/212; 525/221; 525/222

[58] Field of Search ............... 525/209, 212, 231, 221, 525/222, 196, 201

[56] References Cited

U.S. PATENT DOCUMENTS

| | | | |
|---|---|---|---|
| 3,407,159 | 10/1968 | Fink et al. | 525/209 |
| 3,426,106 | 2/1969 | Züp et al. | 525/221 |
| 3,428,582 | 2/1969 | Deex | 525/221 |
| 4,380,606 | 4/1983 | Coran et al. | 525/196 |

FOREIGN PATENT DOCUMENTS 1144104  3/1969  United Kingdom ................ 525/212

Primary Examiner—Allan M. Lieberman
Attorney, Agent, or Firm—Connolly and Hutz

[57] ABSTRACT

The object of the invention is the use of ethylene-vinyl acetate-copolymers produced by emulsion polymerization and containing unipolymerized acids, for the modification of polyvinyl chloride.

3 Claims, No Drawings

USE OF SPECIAL ETHYLENE-VINYL ACETATE-COPOLYMERS FOR THE MODIFICATION OF PVC

The object of the invention is the use of copolymers of 20 to 79.9% by weight of vinyl acetate, 79.9 to 20% by weight of ethylene and 0.1 to 20% by weight of an unsaturated carboxylic acid and/or sulphonic acid and/or phosphonic acid, in each case in relation to 100% by weight of the total consisting of vinyl acetate, ethylene and unsaturated acids, which are produced by emulsion polymerisation in water, for the modification, preferably the shock resistant modification of polyvinyl chloride (PVC).

Preferred products comprise 30 to 65% by weight of vinyl acetate, 60 to 40% by weight of ethylene and 0.3 to 10% by weight of unsaturated acids, in each case again in relatin to 100% by weight of the total consisting of vinyl acetate, ethylene and unsaturated acids.

The kinds of copolymers based on vinyl acetate and ethylene and their production are known (see for example DE-AS No. 1 495 645, DE-OS No. 2 250 517, DE-OS No. 2 309 368 and DE-OS No. 2 431 410).

A method for the continuous production of polymer dispersions under pressure is described in EP-OS No. 0 039 451. As monomers, especially ethylene and possibly vinyl chloride and/or vinyl acetate are to be considered. The polymerisation is carried out in the presence of salts of unsaturated acids. The latex obtained according to Example 7 is suitable as a binding agent for interior and exterior coats of paint.

By contrast, the ethylene-vinyl acetate-copolymerizate of Example 9, that does not contain unipolymerised salts of unsaturated acids or unsaturated acids, is recommended for the production of shock resistant PVC.

The quality of such acid group-free latices as PVC modifiers is greatly inferior in comparison with the modifiers according to the invention based on EVAC-copolymerizates containing acid groups.

Further, the use of ethylene-vinyl acetate copolymers from mass or solution polymerisation for PVC modification is known and has commercially been exclusively used until now (DE-AS No. 1 494 127).

A disadvantage of the polymerizates produced in this manner is that they arise as elastic granulates with a strong tendency to stick together, which are with difficulty directly mixed with PVC. In practice, they can only be brought into a manageable form by a graft polymerisation with vinyl chloride.

The use of EVA emulsions would have the advantage that they may be mixed directly with PVC into very homogeneously dispersed mixtures. Further, in the event of latex particles arising one could stabilize the optimal particle size of the EVA dispersion in the PVC by means of targeted cross-linking. This is not possible in the incorporation of granulates of solution or mass polymerisation.

Previous EVA-copolymers, produced by emulsion polymerisation without unipolymerised acids, are technically not suitable for various reasons which can be structurally conditioned, but can also be casued by the co-application of larger portions of polymerisation auxiliaries. Above all, they result in insufficient thermostability of the modified PVC.

By means of the use according to the invention of the acid-modified ethylene-vinyl acetate-copolymerizate, a good thermostability of the resulting mixture with PVC is obtained, comparable to mixtures based on an EVA-Mass- or solution polymerizate, yet whose incorporation offers significant advantages in comparison with the latter, as described above.

Suitable unsaturated carboxylic acids are semi-esters of maleic acid, and also iraconic acid, acrylic acid or methacrylic acid. The acid groups are hereby present in the copolymerizate at least partially in the form of their salts.

Suitable unsaturated sulphonic acids are e.g. vinylsulphonic acid, allylsulphonic acid, methallylsulphonic acid, acrylamide derivatives of formula (1)

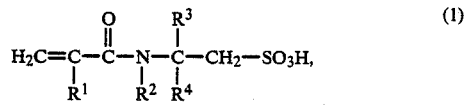

in which
R$_1$ stands for H, CH$_3$,
R$_2$ stands for H, CH$_3$, C$_2$H$_5$,
R$_3$ and R$_4$ independently of each other stand for CH$_3$, C$_1$–C$_8$-Alkyl.

Examples of unsaturated phosphonic acids are vinyl phosphonic acid, allyl phosphonic acid or their derivatives.

In the copolymerizates to be used according to the invention, the acid groups are partially present in the form of their alkali (Li-, Na-, K-) or ammonium salts.

The production of the copolymerizates to be used according to the invention can take place discontinuously as well as continuously. Continuous production is preferred, for example in accordance with EP-OS No. 0 039 451.

Emulsifiers and protective colloids can be added in small quantities as polymerisation auxiliaries for stabilising the emulsions. The unipolymerisation of the acidic groups also makes possible the advantageous emulsion polymerisation without these auxiliaries, which leads to a further increase in the thermostability of the PVC compounds.

Water soluble radical constituents such as persulphates, H$_2$O$_2$ or water soluble azo compounds are used as initiaters for the polymerisation. The desired pH value is preferably set between pH 8 and pH 4 with the help of buffer substances. Through the pH setting it is also established in what proportion carboxyl groups in addition to the carboxylic-acidic salts should be unipolymerised.

The stabilising effect of the acidic groups can preferably be improved by producing salts of cations of polyvalent, preferably bi-valent metals such as Cd, Pb, Sn, Ba, Zn, which are also known for PVC stabilising.

The salt formation is suitably produced with the polyvalent cations by mixing corresponding hydroxides, oxides or acetates into the finished EVA latices.

The copolymerizates to be used according to the invention can also be cross-linked, without incorporation problems occuring as are known in cross-linked copolymerizates which are not produced following emulsion polymerisation.

Bi or polyfunctional vinyl monomers such as for example divinyl adipate are suitable as cross-linkers.

The particle size in the EVA emulsions obtained is between 80 and 800 nm, preferably between 250 and 500 nm, which are especially well produced by means of the co-application of the unsaturated acids.

The EVA copolymerizates according to the invention can be combined with PVC by various ways and means. The simplest way is to mix the EVA latex with PVC powder or PVC suspensions and work them up together. The relative proportions between the PVC and EVA product according to the invention should be 98–90% by weight, preferably 96–92% by weight of PVC and 2–10% by weight, preferably 4–8% by weight of EVA. Also, the production of a master batch may be followed, producing PVC mixtures with heightened concentrations of EVA, which can then be mixed to the definitive proportion of modifier and PVC for the processing.

Of course, the EVA polymerizates produced through emulsion polymerisation can also be dissolved in their watery emulsion in monomeric vinyl chloride and subjected to a graft polymerization, as a result of which equally excellent shock resistant PVC products can be obtained. An advantage of this mode of proceeding is that EVA-VCL-monomer solutions can be more quickly and easily produced than by the use of EVA granulates.

The new EVA modifiers distinguish themselves by comparison with the products known until now produced by mass or solution polymerisation, in that, with equal effectiveness and thermostability, they can be mixed with PVC as shock resistant components in a technically much simpler and more uniform manner, and, further, that the PVC mixtures may be worked at higher temperatures and greater working speeds, and further through the possibility of producing cross-linked particles of defined particle size and degree of cross-linking.

EXAMPLES

A.1 Continuous production of an ethylene/vinylacetate-copolymer latex with in-built sulphonic groups A VA-Autoclave with a free volume of 42.7 liters with an anchor mixer serves as the apparatus. The dosing of the solutions and of the vinyl acetate is achieved through separate dosing pumps. The ethylene is added in a regulated manner in doses through a gas measure gauge. The internal temperature is regulated. It is operated by a differential pressure controlled level control system. Delivery is achieved through a clocked 200 ml sluice.

29400 parts by weight of an ethylene-vinyl acetate latex (polymer composition c. 42% by weight of vinyl acetate, c. 58% by weight of ethylene) with a solid matter proportion of between 40 and 50% by weight and an average particle size of 150 to 200 nm is introduced into the autoclaves. Then a mixer speed of 150 rpm is set and a solution of 40 parts by weight of ammonium peroxydisulphate in 500 parts by weight of de-ionized water is pumped into the autoclave.

Then for the removal of oxygen the autoclave is evacuated to 100 mbars and rinsed three times with two bars of ethylene. After this, 50 bars of ethylene are applied and heated to an internal temperature of 65° C. After the internal temperature of 65° C. is achieved, 100 bars of ethylene are applied and the control system set to this value.

Then the following solutions, or monomers, are pumped from above through 3 separate supplies with dosing pumps into autoclaves.

(1) 2900 ml/h of an aqueous solution consisting of:
3.13 parts by weight of peroxydisulphate sulphate
15.66 parts by weight of $C_{12}$–$C_{14}$-alkylsulphonate
4.70 parts by weight of acrylic dimethyl taurine
4.54 parts by weight of sodium hydroxide (0.2 molar solution)
0.01 parts by weight of iron-III-complexon solution (0.24 m Fe-III-nitrate; 0.48 m disodium ethylene diamine tetraacetic acid, 0.96 sodium hydroxide)
in 1000 parts by weight of de-ionized water
(2) 300 ml/h of an aqueous solution consisting of:
12.15 parts by weight of sodium hydroxymethane sulphinate dihydrate (Rongalit C) in 1000 parts of weight of de-ionized water
(3) 1750 ml/h of distilled vinyl acetate 6.4 kg latex/h on average are discharged through a clocked 200 ml sluice. The share by mass in percentage terms of solid matter averages 45. The ethylene pressure is kept constant at 100 bars by a control system. The level of the autoclave is set at 80% through the differential pressure controls.

An MVZ of 6.7 and an RZA of 68 g (solid matter) $1^{-1}h^{-1}$ is calculated from the quantity discharged and the solids content. The latex containing residual monomers is liquid and becomes highly viscous after the demonomerisation. However, if wished, the viscosity can be reduced through the addition of electrolytes and emulsifers.

The viscous latex forms a transparent elastic film after drying. According to analysis of the polymer, the following proportions result: (% by weight)
vinyl acetate: 42
ethylene: 57.5
acrylic dimethyl taurine-Na-Salt: 0.5

The vinyl acetate monomer reaction is c.75%. The limiting viscosity number measured in tetrahydrofuran is 1.1 dl/g at 25° C.

A.2 Continuous production of an ethylene vinyl acetate-copolymer latex without in-built acid groups (comparison example).

The method is as given in Example A.1, with a change in the Solution 1 to be apportioned:

No acrylic dimethyl taurine is used, but the $C_{11}$–$C_{14}$ alkylsulphonate quantity is increased to 20.4 parts by weight.

After adjustment of the reaction equilibrium a solid content of 46% by weight is obtained, corresponding to an RZA of 70 $gl^{-1}h^{-1}$. The analysis of the film yields 41% by weight of vinyl acetate in addition to 59% by weight of ethylene. The limiting viscosity number is unchanged.

B. EXAMPLES FOR APPLICATION TECHNOLOGY TESTING

B.1. Use of A.1.

Powdery mixtures are produced as are usual for the extrusion of building profiles for external use:

A dry blend is produced in a hot-cool mixer (1500 rpm) out of 940 parts by weight of suspension PVC (K-Value according to Fikentscher 68), 73 parts by weight of powdery mixtures of 60 parts by weight of polyethylene vinyl acetate (produced according to Example A.1) and 13 parts by weights of filler (natural $CaCO_3$, surface treated), 35 parts by weight of lead phosphite sulphite complex, 15 parts by weight of barium/cadmium-stabiliser solid (min. 10% Cd-content), 1.2 parts by weight of di-basic lead stearate, 2 parts by weight by calcium stearate, 12 parts by weight of wax ester, 15 parts by weight of hydrocarbon wax, 27 parts by weight of finely powdered natural, surface treated chalk, 40 parts by weight of titanium dioxide (Rutile-type) according to the method usual for rigid PVC. 500 g of this PVC moulding material are worked into a rough rolled sheet on a laboratory roll mill under rolling conditions described in the preparation of test samples B1, B2 and B3.

Approximately 100 g are taken from the above rolled sheet material for thermostability testing. The results are given in the Table.

B.2. Use of A.2 (comparative test)

B1 is repeated using an emulsion copolymer produced following Example A2.

B.3. Use of an EVA-solution polymer (comparative test)

B1 is repeated using a commercially available EVA solution copolymer (MG 150 000, vinyl acetate content 45% by weight).

I. Test samples of B1, B2 and B3 are prepared as follows:

Rough sheet production:
Laboratory roller, roller width 230 mm, roller diameter 110 mm, roller speed 22:18 rpm, roller temperature 190° C., rolling time 10 minutes.

Pressed plate production:
Dimensions 120×120×4 mm; Preheating 7 minutes, pressing 3 minutes at 24.5N/mm², pressing temperature 195° C.

II. Testing of samples of B1, B2 and B3 is as follows:
Thermostability tests

1. Circulating air oven: 0.7 mm thick rough rolled sheets, rolled at 180° C. 10', are tested in a circulating air oven (Mathis System) at a testing temperature of 190° C. for 15', 30', 45', 60', 90', 120' and the degree of colouring judged as a measure of thermostability.

2. Testing of thermostability according to DIN 53381 Sheet 1 (Congo Red Paper Method): 0.7 mm thick rough rolled sheet test samples are cut into small pieces (PKt. 2.3 o.g. DIN) and the time required at a test temperature of 200° C. for the colour change of the Congo Red Paper from red to blue (hydrogen chloride splitting off) is measured.

TABLE

| | Test Results Examples | | |
|---|---|---|---|
| | B1 | B2 | B3 |
| Colouring II.1, 120' | weak yellowish | yellow brown | weak yellowish |
| Colouring Time II.2 | 182 Min. | 138 Min. | 184 Min. |

We claim:
1. Modified polyvinyl chloride comprising
90 to 98% by weight of polyvinyl chloride and
10 to 2% by weight of a modifying copolymer which is 20 to 79.9% by weight of vinyl acetate, 79.9–20% by weight of ethylene and 0.1–20% by weight of at least one of unsaturated carboxylic acid, unsaturated sulphonic acid or unsaturated phosphonic acid, produced by emulsion polymerisation in water,
wherein said carboxylic acid comprises semi-esters of maleic acid, itaconic acid, acrylic acid or methacrylic acid,
said sulphonic acid comprises vinyl sulfonic acid, allysulfonic acid, methallysulfonic acid or an acid of the formula

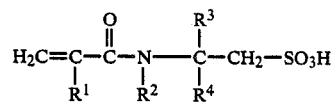

wherein
$R^1$ is H or methyl;
$R^2$ is H or methyl or ethyl; and
$R^3$ and $R^4$ indpendent of each other are alkyl having 1 to 8 carbon atoms said phosphonic acid comprises vinyl, allyl phosphonic acid or their derivatives,
the acid groups in the copolymer being at least partially in the form of the corresponding alkali metal or ammonium salt.

2. Modified polyvinyl chloride according to claim 1 wherein the copolymer contains 30–65% by weight of vinyl acetate, 60–40% by weight of ethylene and 0.3–10% by weight of unsaturated acid.

3. Modified polyvinyl chloride according to claim 1 which comprises 92 to 96% by weight polyvinyl chloride and 8 to 4% by weight of modifying copolymer.

* * * * *